United States Patent [19]

Maeda

[11] Patent Number: 4,856,076
[45] Date of Patent: Aug. 8, 1989

[54] BINARY CODING CIRCUIT FOR OCR
[75] Inventor: Naoki Maeda, Osaka, Japan
[73] Assignee: Sumitomo ELectric Industries, Ltd., Osaka, Japan
[21] Appl. No.: 70,733
[22] Filed: Jul. 7, 1987
[30] Foreign Application Priority Data
   Jul. 8, 1986 [JP] Japan .................. 61-160446
[51] Int. Cl.$^4$ .................. G06K 9/00
[52] U.S. Cl. .................. 382/53; 382/50; 358/464; 328/146
[58] Field of Search .................. 382/50, 51, 53; 358/282; 307/358; 328/146, 147, 150, 135

[56] References Cited

U.S. PATENT DOCUMENTS

| | | | |
|---|---|---|---|
| 3,534,334 | 10/1970 | Bartz et al. | 382/53 |
| 3,987,413 | 10/1976 | Wilmer | 382/53 |
| 4,430,748 | 2/1984 | Tuhro et al. | 382/50 |
| 4,442,544 | 4/1984 | Moreland et al. | 382/53 |
| 4,446,486 | 5/1984 | Itoh | 382/53 |
| 4,468,704 | 8/1984 | Stoffel et al. | 382/53 |
| 4,584,703 | 4/1986 | Hallberg | 382/50 |

Primary Examiner—Leo H. Boudreau
Assistant Examiner—Donald J. Daley
Attorney, Agent, or Firm—Cushman, Darby & Cushman

[57] ABSTRACT

This invention provides a binary coding circuit particularly suited for use in an optical character reader which "reads" characters or symbols using a photoelectric conversion cell. A delay circuit has one input for receiving an output of the photoelectric conversion cell, and at least three separate and distinct delayed outputs providing respective delays that are different from each other. A threshold determining circuit is arranged so that when one of the delayed outputs is selected to be a binary-coding target signal, the threshold determining circuit receives as its inputs a plurality of ones of the delayed outputs including one delayed output having a larger delay time than that of the binary-coding target signal and one delayed output having a smaller delay time than that of the binary-coding target signal, so as to produce a threshold signal at a value which is the greater of the delayed signals. A comparator circuit receives at a first input thereof the binary-coding target signal and receives at a second input thereof the threshold signal. It compares the binary-coding target signal with the threshold signal to thereby produce a binary signal of the appropriate level.

5 Claims, 4 Drawing Sheets

BINARY CODING CIRCUIT FOR OCR

BACKGROUND OF THE INVENTION

The present invention relates in general to binary coding circuits of the type used for analog signals. More specifically, the present invention provides a binary coding circuit for quantizing the output of a photoelectric conversion cell in an optical character reader (OCR). It quantizes the photoelectric conversion cell output into a binary signal having two values corresponding to a background area and a character or symbol area.

The term "character" as used herein includes any kind of character or symbol. Thus, the term includes, but is not limited to alpha-numeric characters, symbols, Japanese "kana", etc. The term "symbol" includes but is not limited to bar codes, etc. Characters are often printed black on white paper. The characters can be discriminated from a blank space by discerning a difference between white and black. However, the paper which forms the background of the characters is not always white. This makes it more difficult to discern between the character and background. The area where characters are printed is hereinafter referred to as a "character area". In contrast, the blank space, where no character is printed, is hereinafter referred to as a "background area".

The term "optical character reader" (OCR) is used in a broad sense to include various types of apparatus for optically reading characters imprinted on a surface. In a typical OCR, the surface to be read is illuminated with light. A lens system images light reflected from the surface onto a matrix of photoelectric cnversion cells. These cells provide output signals that are responsive to the intensity of light on the cells. Output signals of the cells are converted by a binary coding circuit into binary signals indicating character areas and background areas. Characters are discriminated on the basis of the binary signal.

Light incident on the photoelectric conversion cells varies in accordance with the imprinted characters. Because the characters are black and the background is white, the level of incident light varies corresponding to the existence of characters.

However, there are operational difficulties with OCRs. Characters written on the paper may not always be imprinted evenly on a page being read. Also, the output of a photoelectric conversion cell scanning the paper does not always take one of two values corresponding to black or white. Rather, it may vary continuously and irregularly. Even if the characters are printed using type, a character may not be formed exactly the same each time. Also, characters vary from one another in shape and size, number of strokes, etc. The output of a photoelectric conversion cell thus may vary widely in an analog manner and its output may change both spatially and temporally.

The output does not simply take either one of a maximum value and a minimum value. Rather, the output continuously varies between the maximum and minimum values. A simple binary coding method for converting such an analog concentration signal into a binary signal is to compare it with a fixed threshold level. However, this binary coding method has a disadvantage in that the character area is often mistaken or misjudged for background area. Characters are often at least partially missed.

The simply binary coding method has a further disadvantage in that the background area is often mistaken for character area. The characters may be defaced or obscured by stains between character lines, etc. If character recognition is made on the basis of the binary-coded data in the manner as described above, many errors result.

The term "threshold level" as used herein refers to a value that is compared with the amplitude of a signal. As the result of comparison, an output signal of "0" or "1" is generated, where the "0" or "1" constitutes a binary code. If the threshold level is fixed, the aforementioned problems exist. Accordingly, a fixed threshold level can not be used unless the characters are extremely simple. Japanese Patent Publication No. 37952/1985 discloses a technique in which four different thresholds are used to binary code the output of a photoelectric conversion cell. Of the four thresholds, one which may provide an optimum result of binary coding is selected.

The procedure of determining the optimum threshold will now be described. The characters have line widths that vary from character to character. The line width of a character printed in Gothic type is large in comparison with the same character printed in a different "font". Even for characters printed with the same font, the line width of characters may vary from character to character depending on calligraphic style. Further, some lines of a particular character may be thicker than other lines of the same character. For example, vertical lines of a certain character may be thicker than horizontal lines of the same character, or vice versa and the width of one line in a character may vary from one end of the line to the other.

According to the Japanese Patent Publication No. 37952/1985, an optimum threshold is selected on the basis of the change of the line width. A large number of arithmetic operations are required to do this. It can be said that an average line width of characters printed using a certain type font is generally within a predetermined range. The following equation applies so that line width can be computed.

$$W(\text{width}) = \frac{\text{Number of black points}}{\text{Number of surrounding points}}$$

In the equation, the term "number of black points" means the number of black meshes (picture elements) in the whole picture scene. The term "number of surrounding points" means the number of black picture elements on the boundary of white and black areas.

Assume that, for example, a character is simply constituted by a horizontal bar "-" which includes black picture elements of r and q in number arranged in rows and columns respectively ($q >> r$). The number of black points is $r \times q$, and the number of surrounding points is $(2q + 2r - 2)$. The real line width of the character is r. Accordingly, the line width W as defined by the above equation is approximately $r/2$. It thus may be said that the line width W is defined as the half width of the real character line.

The average line width of characters printed in a certain type font can be obtained by repeating such arithmetic operations on all characters. Assume that W is known to be 1.5 with respect to a certain group of characters belonging to a certain dictionary pattern.

Assume that a typescript is made up of the group of characters contained in the dictionary pattern. The typescript is optically read and the resulting signal is binary coded by comparing it with four separate and distinct threshold levels $U_1$, $U_2$, $U_3$ and $U_4$. Four binary patterns can be thus obtained to thereby determine black-and-white picture elements. With respect to the four patterns, the number of black points and the number of surrounding points are counted to thereby calculate the line width.

If the threshold level is too low, the number of black points is excessively increased so that the line becomes thick, that is, the line width becomes large. If the threshold level is too high, the number of white points is excessively increased so that the line becomes thin, that is, the line width becomes small. Thus, four values of line width, $W_1$, $W_2$, $W_3$, and $W_4$, can be calculated. Because the average line width W of the characters contained in the dictionary pattern is predetermined, an optimum one that approaches W is selected from the four values of line width, $W_1$, $W_2$, $W_3$ and $W_4$. Accordingly, one binary pattern is selected from the four binary-coding patterns on the basis of the thus selected optimum line width.

According to the Japanese Patent Publication No. 37952/1985, binary coding is performed by use of four threshold levels to thereby calculate values of line width. The calculated values of line width are compared with a predetermined value of line width to thereby select an optimum one of the calculated values of line width which is the most approximate to the predetermined one. This method lacks reliability and a large number of arithmetical operations are required.

Also, because it is necessary to calculate four binary patterns, it is necessary to have a picture memory with a capacity that is four times larger than would otherwise be necessary. If binary-coding processing is performed to obtain the four binary patterns simultaneously, the number of comparator circuits and the like must be multiplied by four. If the binary-coding processing is performed sequentially, on the other hand, the time required to process is four times that which would otherwise be required.

The number of black points and the number of surrounding points should be counted according to every pattern. The time required for counting the number of surrounding points is long, because the boundary of white and black must be detected. Furthermore, the line width in the dictionary pattern should be predetermined, which is one of the most difficult aspects of this technique. It is necessary to apply it to various kinds of characters. That is, the range of use is limited to specific kinds of characters. However, it is desired that any character be read even if the character has any line width.

A further disadvantage occurs with the four threshold arrangement. Although four thresholds $U_1$-$U_4$ are used, those thresholds are used in the alternative. Once a threshold is selected, it is used for the whole picture. The local characteristics of the picture are not considered. If the character is so complex that two peaks are near to each other, the output between the peaks is not zero. Rather, the output is "drawn up" by the two peaks, and it is difficult to discriminate the intermediate output from the peaks. Accordingly, the space between two lines becomes "smeared".

To detect the space between lines, it is necessary to identify a small level difference between the intermediate value and each peak value. This is however, impossible as long as a single threshold level is used throughout the entire picture. The use of a locally variable threshold level would make it possible to detect local characteristics.

As discussed above, the binary coding circuit according to the Japanese Patent Publication No. 37952/1985 has the further disadvantages of large circuit scale and high cost. Also, real time processing and use for all types of characters are impossible.

SUMMARY OF THE INVENTION

Therefore, the present invention provides a binary coding circuit which is simple in construction, yet capable of determining an optimum threshold level. Furthermore, it can quantize an analog signal into binary code in real time. It can read any type of characters without mistake, and it securely identifies the "black" portions of picture elements.

The output of the photoelectric conversion cell is proportional to the intensity of light impinging thereon. Thus, the cell output becomes large for a black picture element and becomes small for a white one. It is sufficient that portions corresponding to peaks of the output can be detected. The term "peak" includes large peaks, small peaks, wide peaks, and narrow peaks, and it is considered that large and wide peaks correspond to bold-faced characters and that small and narrow peaks correspond to light-faced characters.

Let the output of the photoelectric conversion cell be represened by "I". The output varies as a temporal function $\Psi(t)$. If the function takes a peak at $t=t_0$, the following inequalities should hold for $t=t_0$:

$$\Psi(t_0) > \Psi(t_0 - \tau) \tag{1}$$

$$\Psi(t_0) > \Psi(t_0 + \tau') \tag{2}$$

In the inequalities, each of $\tau$ and $\tau'$ represents a short positive amount of time.

The fact that $\Psi(t)$ takes a peak at $t=t_0$ means that $I(t_0)$ is larger than the values immediately preceding and succeeding the value at $t=t_0$. Accordingly, the inequalities (1) and (2) are established. Each of $\tau$ and $\tau'$ can take an arbitrary value but is provided to determine a short interval of time.

If $\tau$ and $\tau'$ are fixed, the inequalities can be used as simple comparison inequalities. In this case, the necessary and sufficient condition that each of $\tau$ and $\tau'$ can take an arbitrary value is removed. Accordingly, in the case where the function varies widely, there is the possibility that the function may have a peak value if the inequalities (1) and (2) are satisfied on the basis of fixed $\tau$ and $\tau'$. However, the peak can be almost perfectly detected from the inequalities (1) and (2) as long as $\tau$ and $\tau'$ are selected adequately.

$\Psi(t-\tau)$ represents a delayed signal, and $\Psi(t+\tau')$ represents an advanced signal. The following function (3) is now assumed with $\tau$ and $\tau'$ as parameters.

$$\Phi(t) = \Psi(t) - \max\{\Psi(t-\tau), \Psi(t+\tau')\} \tag{3}$$

In the function (3), the term "max { }" means selecting the largest one of the signals represented by what is enclosed within the braces.

If the value of $\Phi(t)$ is positive for arbitrary short time $\tau$ and $\tau'$, the function should be at a peak value. The inequality (3) is thus equivalent to the two inequalities (1) and (2). That is, the inequality (3) is equivalent to the combination of inequalities (1) and (2).

Assuming that $\tau$ and $\tau'$ are fixed values, $\Phi(t)$ does not always take a peak value even if it is a positive value. However, the peak value can be almost perfectly detected when $\Phi(t)$ is positive, as long as $\tau$ and $\tau'$ are selected adequately.

Accordingly, it is possible to detect the peak value if three temporally different signals consisting of an original signal I (t) and two signals produced by delaying the original signal for two time intervals are compared according to the inequality (3). However, it is impossible to compare the original signal I (t) with the maximum value of the delayed signal and advanced signal, because the advanced signal is not in existence.

Accordingly, assume now that a certain signal is delayed for three or two time intervals by shifting the time axis. Of the thus produced signals, one signal having intermediate delay time can be compared with another signal having a delay time less than this intermediate delay time. On the assumption, the following inequality (4) equivalent to the expression (3) can be obtained.

$$\Phi(t-t_1) = \Psi(t-t_1) - \max\{\Psi(t), \Psi(t-t_1-t_2)\} \quad (4)$$

If $t-t_1$, $t_1$ and $t_2$ are respectively replaced by t, $\tau'$ and $\tau$, this inequality is quite equal to the inequality (3).

The binary coding circuit according to the present invention includes:

(a) a delay circuit having one input for receiving an output of the photoelectric conversion cell, and at least three delayed outputs respectively delayed for periods of delay time different from each other;

(b) a threshold determining circuit arranged so that when one of the delayed outputs of the delay circuit is selected to be a binary-coding target signal, the threshold determining circuit receives as its input a plurality of ones of the delayed outputs including one delayed output having larger delay time than that of the binary-coding target signal and one delayed output having smaller delay time than that of the binary-coding target signal, so as to produce a threshold signal; and (c) a comparator circuit arranged to receive at its two inputs the binary-coding target signal and the threshold signal, respectively, so as to compare the binary-coding target signal and the threshold signal with each other to thereby produce a binary signal.

DETAILED DESCRIPTION OF THE PREFERRED EMBODIMENTS

Figure 1:
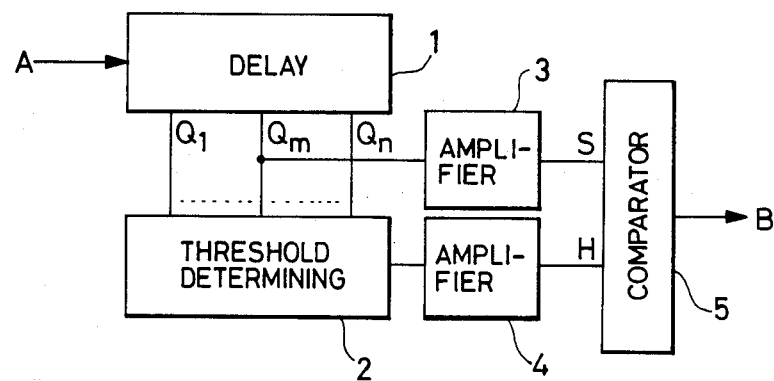
FIG. 1 is a block diagram of a binary coding circuit according to the present invention.

FIG. 1 is a block diagram of a binary coding circuit according to the present invention.

The output A of a photoelectric conversion cell is generated unit by unit corresponding to picture elements. The cell output is a function of light intensity. The relationship of cell signal output to light intensity can be of either sense as a matter of design choice. For example, the output may be high when a white picture element is selected and low for a black picture element, or the output may be high for a black picture element and low for a white one. In any case, the output can be arbitrarily oriented by using inverter circuitry. We assume henceforth that the photoelectric conversion cell output is high when a character, i.e., a black picture element is being "viewed".

A delay circuit 1 generates at least three delayed signals $Q_1, \ldots Q_m, \ldots Q_n$. One signal $Q_m$ adequate for binary coding is selected from among those delayed signals. Delayed signals other than the signal $Q_m$, which are $(n-1)$ in number, are linearly coupled or the maximum is selected from the delayed signals, so that a threshold H is determined. This function is carried out by a threshold determining circuit 2.

As one possible example, presume that the threshold is determined by the maximum.

$$H = \max\{Q_1, Q_2, \ldots Q_n\} \quad (5)$$

If the amplification factor of $Q_m$ is larger than 1, the equation (5) should contain $Q_m$.

Alternatively, the threshold can be determined by linear coupling.

$$H = \sum_{\substack{i=1 \\ i=m}}^{n} c_i Q_i \quad (6)$$

In the equation (6), the linear coupling coefficient is adequately predetermined, and n is not less than 3, that is, $n \geq 3$.

Although $Q_m$ is a signal to be binary-coded, the signal may be amplified by an amplifier circuit 3 if the signal from the delay circuit 1 is low in amplitude and high in impedance. Amplification may be omitted if not necessary.

Threshold H is determined by threshold determining circuit 2. The threshold is locally determined so as to be changed temporally. This threshold is quite different from the conventionally fixed threshold. This threshold is also different from the threshold common to the whole picture, as disclosed in Japanese Patent Publication No. 37952/1985. The threshold according to the present invention is a locally variable threshold level which is individually produced from each local signal delayed or effectively advanced.

A most simple case is as follows: Three delayed signals $Q_1$, $Q_2$ and $Q_3$ are produced. Assume that $Q_2$ is a signal to be binary-coded, and the threshold H is determined from the equation (7) on the basis of the two signals $Q_1$ and $Q_3$.

$$H = \max\{Q_1, Q_3\} \quad (7)$$

The threshold H is then compared with $Q_2$. Such comparison is equivalent to the equation (4) or (3). If necessary, the threshold level H may be amplified by an amplifier circuit 4.

S represents a signal to be binary-coded, obtained by amplifying $Q_m$ (or without amplifying $Q_m$). H represents a threshold signal obtained by amplifying the threshold level (or without amplifying it). To minimize confusion, the reference "H" is used both before and after amplification. A comparator circuit 5 compares S and H. If the signal S has a peak value (if the signal S represents a black picture element) S is larger than H (S>H). If the signal S represents a white picture element, S is smaller than H (S<H).

Figure 2:
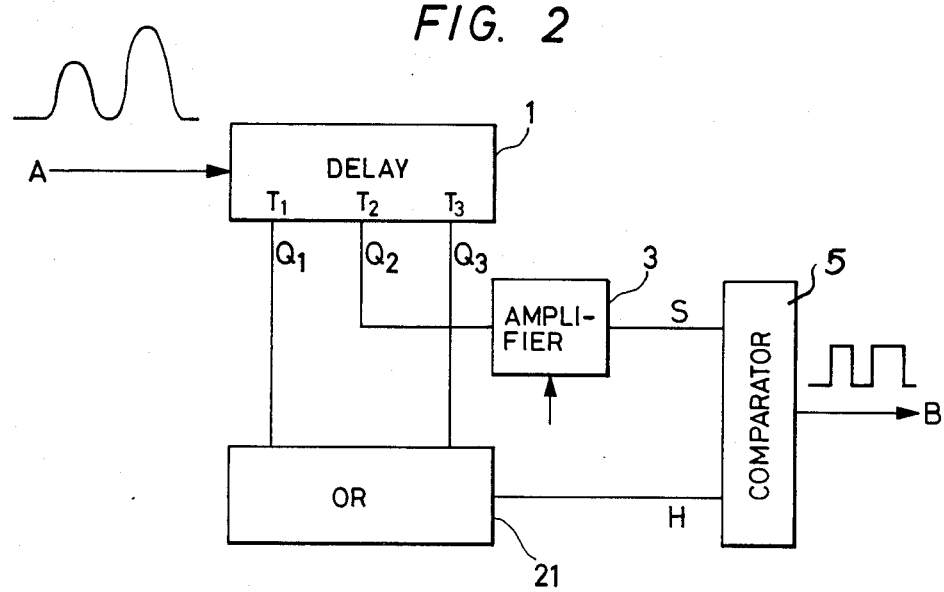
FIG. 2 is a block diagram of the binary coding circuit for use when the input analog signal has a waveform which is upwards convex.

FIG. 2 is a block diagram of the binary coding circuit for use when the input analog signal has a waveform which is upwards convex. This is the case wherein the output becomes high for a black picture element.

The photoelectric conversion cell output A has several positive peaks at various points. The output is delayed by the delay circuit 1 so that three delayed signals $Q_1$, $Q_2$ and $Q_3$ are generated (n=3). The three delay times $T_1$, $T_2$ and $T_3$ are different from each other.

$$0 \leq T_1 < T_2 < T_3 \tag{8}$$

The signal $Q_1$ may be the original output signal per se. In other words, the delay time $T_1$ may be zero. The value of $(T_3-T_2)$ may be equal to the value of $(T_2-T_1)$.

A threshold level is determined on the basis of the advanced signal $Q_1$ and the delayed signal $Q_3$. In this arrangement, an OR circuit 21 is used. The expression "OR circuit" as referring to OR circuit 21 is not necessarily used in its precise manner. Rather, the words "OR circuit" may include a circuit for identifying the maximum value in the same manner as the equation (7).

$$H = \max\{Q_1, Q_3\} \tag{9}$$

$Q_1$ and $Q_3$ are analog quantities and therefore the term "OR circuit" cannot be exactly defined for those two analog quantities. In this description, the circuit for performing such an arithmetical operation as set forth in equation (9) is referred to as an "OR circuit". The output of the circuit is $Q_{max}$. Of course, the operation called for by equation (9) may be replaced by the operation caled for by the expression $H = Q_1 + Q_3$. However, it is difficult to carry out such an analog operation. Accordingly, the circuit has been defined so as to include the functions called for by equation (9).

Signal $Q_2$ passes through the amplifier circuit 3 where it is amplified and offset. The amplified and offset signal from amplifier 3 is coupled to one input terminal of the comparator circuit 5 as a binary coding target signal. In the comparator circuit the signals S and H are compared with each other. If the signal S is in a peak state, S is larger than H. If the signal S is not in a peak state, S is smaller than H. Although the reason has been described above, it will be more intuitively described with reference to FIGS. 3(a) and 3(b).

Figure 3A:
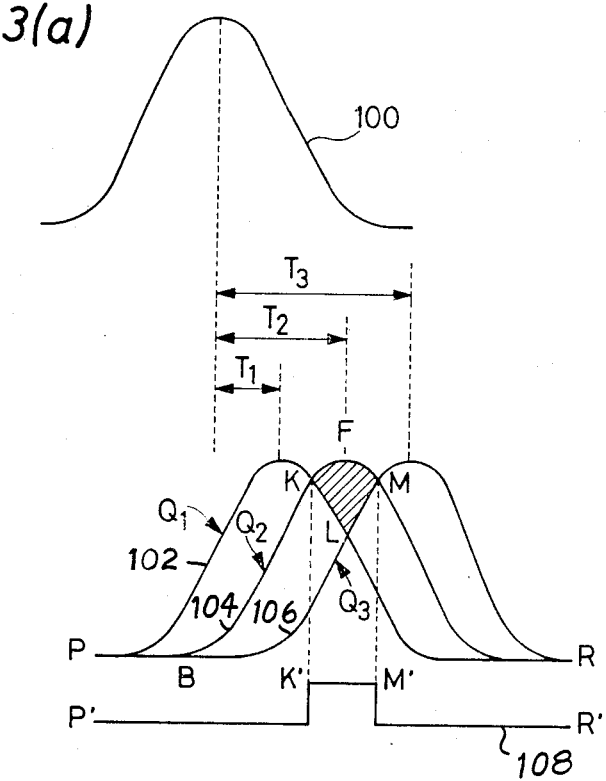
FIGS. 3(a) and 3(b) show waveforms in various parts of the binary coding circuit of FIG. 2.

In FIG. 3(a), curve 100 shows the output of the photoelectric conversion cell having a peak. Curves 102, 104 and 106 shows output signals $Q_1$, $Q_2$ and $Q_3$ respectively delayed for delay times $T_1$, $T_2$ and $T_3$. These output signals have the same waveform but the time axes of the signals are differently shifted. The beginning point of the waveform is denoted by P and the end point of the waveform is denoted by R. The intersection of $Q_1$ and $Q_2$ is denoted by K and the intersection of $Q_2$ and $Q_3$ is denoted by M. The intersection of $Q_3$ and $Q_1$ is denoted by L.

The threshold level H is not a constant voltage. The binary coding circuit according to the present invention is different from the conventional binary coding circuit in this respect. The term "level" may be used in its precise manner because it is variable temporally. The threshold H is the maximum value of $Q_1$ and $Q_3$, so that H is equal to $Q_1$ before the point L and then H is equal to $Q_3$ after the point L. The threshold H is expressed by the curve PKLMR.

In those portions of the curve PK and MR, S is less than H. Accordingly, the binary output B is zero and therefore simply expressed as B=0. In portion KFM of the curve, S is larger than H. The difference between S and H is expressed by the area KLMF. Accordingly, in curve portion KM, the binary output is the value of "1" and simply expressed as B=1.

Reference numeral 108 refers to the waveform of the binary signal B. Between the points K' and M' which correspond to the points K and M, the signal B takes the value of "1". Between the points P' and K' and between the points M' and R', the signal B takes the value of "0".

There may be the case where the width K' M' in which B takes the value of "1" should be enlarged or shortened according to circumstances. In this case, the amplification factors for S and H are changed and an offset $\Delta$ is established.

Figure 3B:
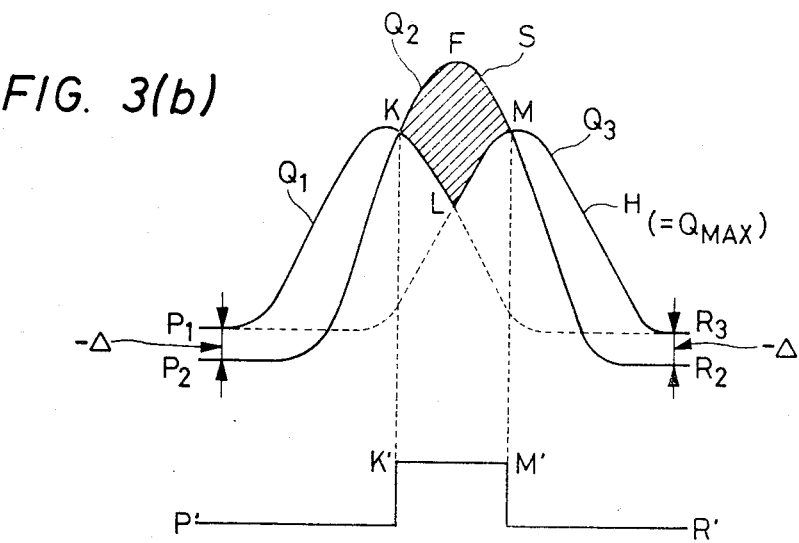

FIG. 3(b) shows the waveforms of $Q_1$, $Q_2$ and $Q_3$ after such a procedure. The amplification factor for $Q_2$ is larger than those for $Q_1$ and $Q_3$. Accordingly, the amplitude of $Q_2$ is larger, but contrarily, $Q_2$ is offset by $\Delta$ downward from $Q_1$ and $Q_3$. The value $P_2$ of $Q_2$ is lowered from the value $P_1$ of $Q_1$ in the start stage. The value $R_2$ of $Q_2$ is lowered by $\Delta$ downward from the value $R_3$ of $Q_3$ in the end stage.

Thus, the waveforms of $Q_1$ and $Q_3$, the threshold H and the intersection L of $Q_1$ and $Q_3$ are not changed, but the binary coding target signal S is changed. The amplification factor is represented by $\pi$ ($\pi > 1$). The change of the binary coding target signal S is expressed as follows:

$$Q_2 \rightarrow \pi Q_2 - \Delta \tag{10}$$

The intersection of $Q_2$ and $Q_1$ is K, and the intersection of $Q_2$ and $Q_3$ is M. The distance between K and M is larger than in the case of FIG. 3(a). The lower portion of FIG. 3(b) shows the binary output B. In this drawing, K'M' corresponds to black.

The reason why the offset $\Delta$ is necessary will now be described. Let Q be a flat signal. That is, Q is a signal which is not in peak state. Q is a signal for generating the binary output B having the value of "0" and because Q is flat, the relation $Q = Q_1 = Q_2 = Q_3$ should hold. A comparative output is expressed by the following equation (11) with the use of $Q_1$ or $Q_3$.

$$\Phi = (\pi Q_2 - \Delta) - Q_1 \tag{11}$$

When the aforementioned relation holds, the equation (11) can be transformed into the following equation (12).

$$\Phi = (\pi - 1)Q - \Delta \tag{12}$$

Thus, if the offset $-\Delta$ is not established, the comparative output becomes positive against the flat signal because of $\pi - 1 > 0$. When the comparative output $\Phi$ is positive, the binary output B takes the value of "1" and there is an erroneous judgment. The offset $-\Delta$ can prevent such a malfunction. It is apparent from the equation (12) that the malfunction cannot be prevented if the offset $\Delta$ does not become deeper as the level of the flat signal Q becomes higher. The depth $-\Delta$ of the offset is determined by judging from the amplification factor $\pi$ and the necessity of preventing the malfunction to the height of the flat level Q.

FIG. 3(a) shows the case where the offset is not established. When the amplification factor $\pi$ is larger than 1, however, the offset is essential. When the amplification factor $\pi$ is not larger than 1, the offset may be used even though its use is not essential. By using offset $-\Delta$, the frequency of mistaking the white area (B=0) for the black area can be reduced.

Figure 4:
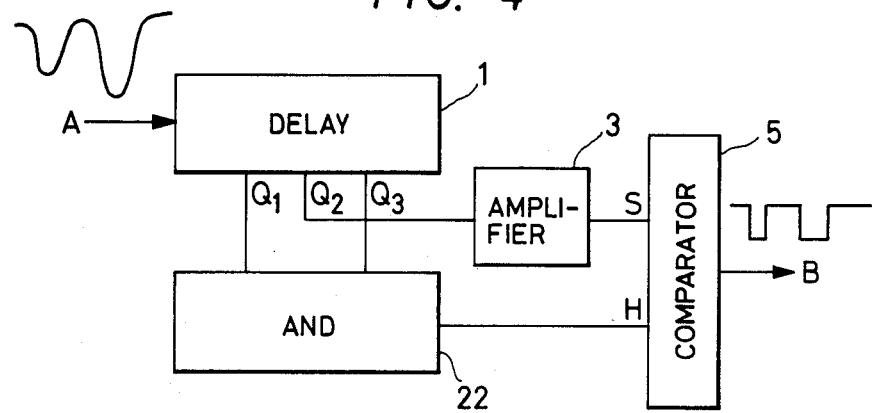
FIG. 4 is a block diagram of the binary coding circuit for use when the input analog signal has a waveform which is downward convex.

FIG. 4 is a block diagram of the binary coding circuit for use when the input signal has a waveform which is downward convex. The operation of the binary coding circuit of FIG. 4 is similar to that of FIG. 2, except that the relation of level is reversed and an AND circuit 22 is used as a threshold determining circuit.

$Q_1$, $Q_2$ and $Q_3$ are output signals delayed for times $T_1$, $T_2$, and $T_3$, respectively. A binary coding target signal S is formed from $Q_2$, and threshold H is formed from $Q_1$ and $Q_3$.

Figure 5:
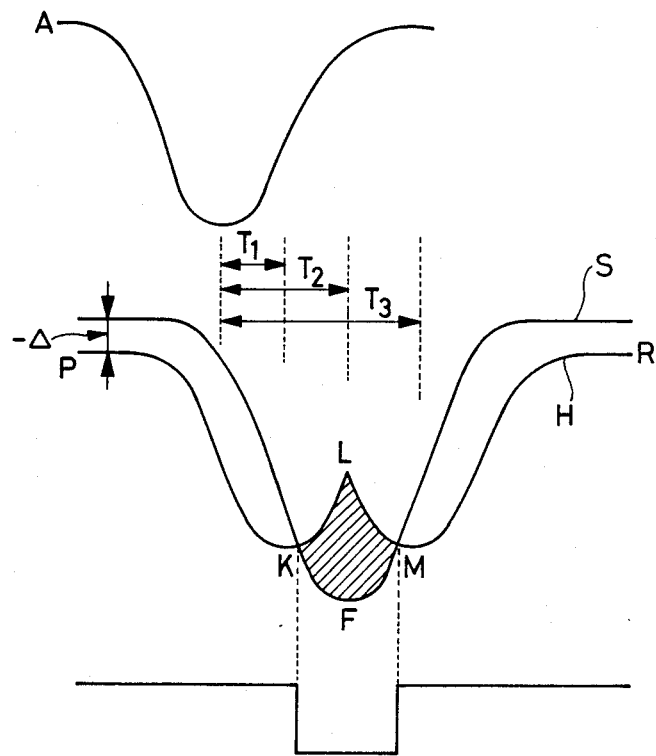
FIG. 5 is a diagram showing waveforms at various parts of the circuit of FIG. 4.

FIG. 5 includes graphs of waveforms explaining the operation of the circuit of FIG. 4. The upper portion of FIG. 5 shows the output of the photoelectric conversion cell. The output signal has a negative peak. The output signal is delayed for times $T_1$, $T_2$ and $T_3$ to thereby generate waveforms $Q_1$, $Q_2$ and $Q_3$ as shown in the center portion of FIG. 5. $Q_2$ is amplified and offset by the positive offset $+\Delta$.

The threshold H is expressed by the minimum value of $Q_1$ and $Q_3$ as follows.

$$H = \min\{Q_1, Q_3\} \tag{13}$$

The comparative output $\Phi$ is defined in the same manner as described above.

$$\Phi = S - H \tag{14}$$

If $\Phi$ is negative, B=0. If $\Phi$ is positive, B=1. The relation B=0 corresponds to the character area, and the relation B=1 corresponds to the background area. The AND circuit 22 is required for defining the threshold H as expressed by the equation (13).

Figure 6:
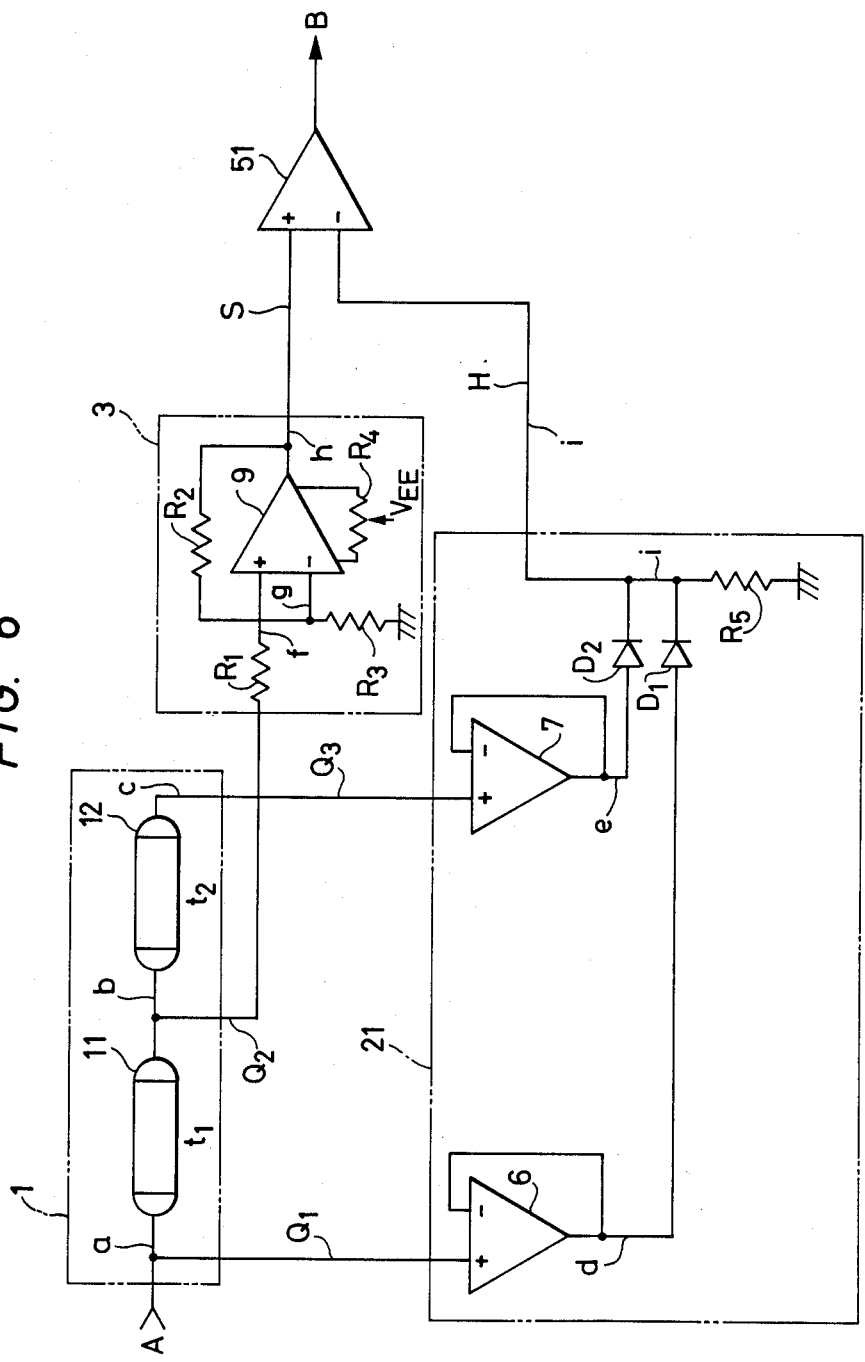
FIG. 6 is a circuit diagram of a binary coding circuit according to another embodiment of the present invention.

FIG. 6 is a circuit diagram of a binary coding circuit according to another embodiment of the present invention.

The output A of a photoelectric conversion cell is applied to a delay circuit constituted by delay lines 11 and 12. The delay lines are used as the most simple method for delaying an analog signal without changing the waveform thereof. The delay lines have delay times $t_1$ and $t_2$, respectively, and are connected in series.

Accordingly, the delay at the input point a of the delay line 11 is 0, the delay at the junction point b between the delay lines 11 and 12 is $t_1$, and the delay at the output point c of the delay line 12 is $(t_1 + t_2)$. If the delay quantities are expressed in the manner of FIG. 2 or FIG. 4, the relation of $T_1=0$, $T_2=t_1$ and $T_3=t_1+t_2$ is established.

A signal $Q_1$ from the point a and a signal $Q_3$ from the point c are respectively connected to non-inversion input terminals of differential amplifiers 6 and 7 in an OR circuit 21. Inversion input terminals of the respective differential amplifiers 6 and 7 are respectively connected to output terminals thereof. These two differential amplifiers 6 and 7 thus function as voltage followers. A voltage is not amplified between the input and output but the impedance is lowered. Accordingly, voltages at the output points d and e of the differential amplifiers 6 and 7 are equal to the voltages of the input signals $Q_1$ and $Q_3$.

The output signals of the differential amplifiers 6 and 7 are respectively passed through diodes D1 and D2 and then connected to an inversion input terminal i of a comparator 51. The inversion input i is grounded through a resistor R5.

The respective cathodes of the two diodes D1 and D2 are connected to each other for the purpose of performing OR operation. The signals at the points d and e have analog quantities, and the higher one is selected from the signals appearing at the point i. A lower one of the signals has no influence on the point i because the diode corresponding to the signal is reversely biased.

The voltage at the point i is a little lower than the maximum value at the points d and e, because the voltage is lowered by about 0.6 V due to the PN junction of the diode. The offset value as described above can be adjusted by a variable resistor R4 in a differential amplifier 9. Offset adjusting resistor R4 has the dual purposes of compensating the lowering of voltage due to the pn junction in each of the diodes D1 and D2, and adjusting the offset value defined by the equations (10)–(12).

The output $Q_2$ from the point b between the delay lines 11 and 12 is amplified and offset by the differential amplifier 9. Differential amplifier 9 amplifies the voltage ($\pi > 1$), while the amplifier 9 may be used as a voltage follower ($\pi = 1$). A constant voltage $V_{EE}$ is connected to an intermediate terminal of variable resistor R4. A resistor R3 is connected to an inverting input terminal g of the differential amplifier 9.

The signal $Q_2$ to be binary-coded is connected to a non-inverting input terminal f of differential amplifier 9 through a resistor R1 which is nearly equal in resistance value to a resistor R3. The output terminal h of the differential amplifier 9 is connected to the inverting input terminal g through a resistor R2. Thus, a non-inverting amplification is carried out to obtain an amplification factor represented by the following equation.

$$\pi = \frac{R1 + R2}{R1} \tag{15}$$

The offset of the output can be arbitrarily established by adjusting the resistor R4. As described above, the resistor R4 has the dual purposes of compensating the lowering of voltage due to the PN junction in each of diodes D1 and D2, and adjusting the offset value $-\Delta$ defined by the equations (10)–(12).

Thus, the two signals S and H are applied to the two input terminals of the comparator 51. The binary signal B takes the value of "1" for the condition of S>H or takes the value of "0" for the condition of S<H. Thus, binary coding takes place as shown in the lower portions of FIGS. 3(a) and 3(b).

This binary coding circuit does not use a fixed threshold level. Further, the circuit does not use a threshold level common to the whole picture. A variable threshold is locally determined by use of the local change of signal. Accordingly, if two types of analog signals respectively having a higher peak value and a lower peak value are continuously received, binary coding is perfected. The circuit is simple in construction but capable of accurately binary coding an analog input signal to a two-valued signal. The circuit is particularly applicable to optical character readers (OCRs) and bar code readers (BCRs). It is particularly well suited for use in portable OCRs and BCRs for point of sale (POS) automated reading where small size, low cost and a high speed are required and where the analog signal level may be unstable.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A binary coding circuit for an optical character reader which identifies characters or symbols using a photoelectric conversion cell, comprising:

a delay circuit having one input terminal for receiving an output of said photoelectric conversion cell as an input signal, and at least three separate and distinct output terminals providing respective time-shifted output representations of said input signal, said time-shifted output representations having delays that are different from each other;

a threshold determining circuit arranged so that when one of said time-shifted output representations of said input signal is selected to be a binary-coding target signal, said threshold determining circuit receives as its inputs a plurality of said time-shifted output representations including one time-shifted output representation having a larger delay time than that of said binary-coding target signal and one time-shifted output representation having a smaller delay time than that of said binary-coding target signal as threshold determining signals for determining a threshold signal, said threshold signal being determined to be the threshold determining signal of said threshold determining signals, having a maximum absolute value for each point in time; and a comparator circuit, having a first input receiving said binary-coding target signal and a second input receiving said threshold signal, for comparing said binary-coding target signal with said threshold signal to thereby produce a binary signal having a first level if said binary-coding target signal is greater than said threshold signal and a second level if said binary-coding target signal is less than said threshold signal.

2. A binary coding circuit according to claim 1, wherein said threshold determining circuit comprises an OR circuit for use when the value of said binary-coding target signal becomes high in the area of characters or symbols so that the threshold determining signal having a maximum absolute value is selected as said threshold signal.

3. A binary coding circuit according to claim 2, further comprising means for amplifying said binary-coding target signal with an amplification factor larger than said threshold signal and adding thereto a negative offset value $(-\Delta)$.

4. A binary coding circuit according to claim 1, wherein said threshold determining circuit comprises an AND circuit for use when the value of said binary-coding target signal becomes low in the area of characters or symbols so that the threshold determining signal having a minimum absolute value is selected as said threshold signal.

5. A binary coding circuit according to claim 4, further comprising means for amplifying said binary-coding target signal with an amplification factor larger than said threshold signal and adding thereto a positive offset value $(+\Delta)$.

* * * * *